United States Patent [19]

Chess

[11] Patent Number: 5,572,590
[45] Date of Patent: Nov. 5, 1996

[54] DISCRIMINATION OF MALICIOUS CHANGES TO DIGITAL INFORMATION USING MULTIPLE SIGNATURES

[75] Inventor: David M. Chess, Mohegan Lake, N.Y.

[73] Assignee: International Business Machines Corporation, Armonk, N.Y.

[21] Appl. No.: 226,610

[22] Filed: Apr. 12, 1994

[51] Int. Cl.[6] ............................. G11B 3/28; H04L 9/00; H04K 1/00
[52] U.S. Cl. ................. 380/4; 380/49; 380/23; 380/24; 380/25; 395/186
[58] Field of Search ................. 380/4, 3, 5, 23, 380/24, 25; 395/186; 371/40.1, 51.1

[56] References Cited

U.S. PATENT DOCUMENTS

| | | | |
|---|---|---|---|
| 4,796,181 | 1/1989 | Wiedemer | 364/406 |
| 4,796,220 | 1/1989 | Wolfe | 364/900 |
| 4,881,264 | 11/1989 | Merkle . | |
| 4,949,380 | 8/1990 | Chaum . | |
| 4,975,950 | 12/1990 | Lentz | 380/4 |
| 4,980,782 | 12/1990 | Ginkel . | |
| 5,005,200 | 4/1991 | Fischer . | |
| 5,019,899 | 5/1991 | Boles et al. . | |
| 5,050,212 | 9/1991 | Dyson | 380/25 |
| 5,097,504 | 3/1992 | Camion et al. | 380/23 |
| 5,121,345 | 6/1992 | Lentz | 364/550 |
| 5,144,659 | 9/1992 | Jones | 380/4 |
| 5,161,192 | 11/1992 | Carter et al. | 380/49 |
| 5,202,982 | 4/1993 | Gramlich et al. | 395/600 |
| 5,237,678 | 8/1993 | Kuechler et al. | 395/600 |
| 5,274,807 | 12/1993 | Hoshen et al. | 395/650 |
| 5,278,901 | 1/1994 | Shieh et al. | 380/4 |
| 5,289,540 | 2/1994 | Jones | 380/4 |
| 5,297,208 | 3/1994 | Schlafly et al. | 380/49 |
| 5,315,655 | 5/1994 | Chaplin | 380/4 |
| 5,343,530 | 8/1994 | Viricel | 380/23 |
| 5,349,655 | 9/1994 | Mann | 395/575 |
| 5,367,573 | 11/1994 | Quimby | 380/25 |
| 5,379,342 | 1/1995 | Arnold et al. | 380/2 |
| 5,379,343 | 1/1995 | Grube et al. | 380/4 |
| 5,386,470 | 1/1995 | Carter et al. | 380/48 |
| 5,408,642 | 4/1995 | Mann | 395/575 |

(List continued on next page.)

FOREIGN PATENT DOCUMENTS

| | | |
|---|---|---|
| 9061263 | 8/1991 | Austria . |
| 449242A | 10/1991 | European Pat. Off. . |

OTHER PUBLICATIONS

Steves, D. H., "Trojan Horse and Virus Detection Using Real Time Auditing", IBM TDB n7b Dec. 1991 pp. 78–81 (Austin).

Arnold, W. C., Chess, D. M. "System for Detecting Undesired Alteration of Software", IBM TDB n11 Apr. 1990 pp. 48–50.

*Primary Examiner*—Thomas H. Tarcza
*Assistant Examiner*—Hrayr A. Sayadian
*Attorney, Agent, or Firm*—Louis J. Percello; Ronald L. Drumheller

[57] ABSTRACT

The present system and method uses information about digital information (objects) to determine whether or not changes to the objects were caused by a normal system operation or by a malicious program. The invention uses a reference separation algorithm to separate, at a reference time, one or more digital objects into a plurality of reference subsets of information that describe the object contents. A plurality of these reference subsets are then selected by a selection algorithm and information associated with each selected reference subset is stored. At some later time, called the test time, a test separation algorithm is used to separate the digital signatures of the object into a plurality of test subsets of information that describe the object contents at test time. A plurality of these test subsets are then selected by the test selection algorithm. A test information algorithm that is associated with each selected test subset then develops test subset information about the respective a test subset. The test subset information and the reference subset information is then compared to develop a set of differences. Rules are applied to the set of differences to determine whether the digital information at test time was changed (maliciously) from the digital information at reference time.

14 Claims, 2 Drawing Sheets

U.S. PATENT DOCUMENTS

| | | | |
|---|---|---|---|
| 5,421,006 | 5/1995 | Jablon et al. | 395/575 |
| 5,440,723 | 8/1995 | Arnold et al. | 395/181 |
| 5,442,699 | 8/1995 | Arnold et al. | 380/4 |
| 5,448,668 | 9/1995 | Perelson et al. | 395/182.19 |
| 5,452,442 | 9/1995 | Kephart | 395/183.14 |
| 5,455,941 | 10/1995 | Okuno et al. | 395/600 |
| 5,473,769 | 12/1995 | Cozza | 395/183.15 |
| 5,485,575 | 1/1996 | Chess et al. | 395/183.14 |
| 5,502,815 | 3/1996 | Cozza | 395/183.14 |

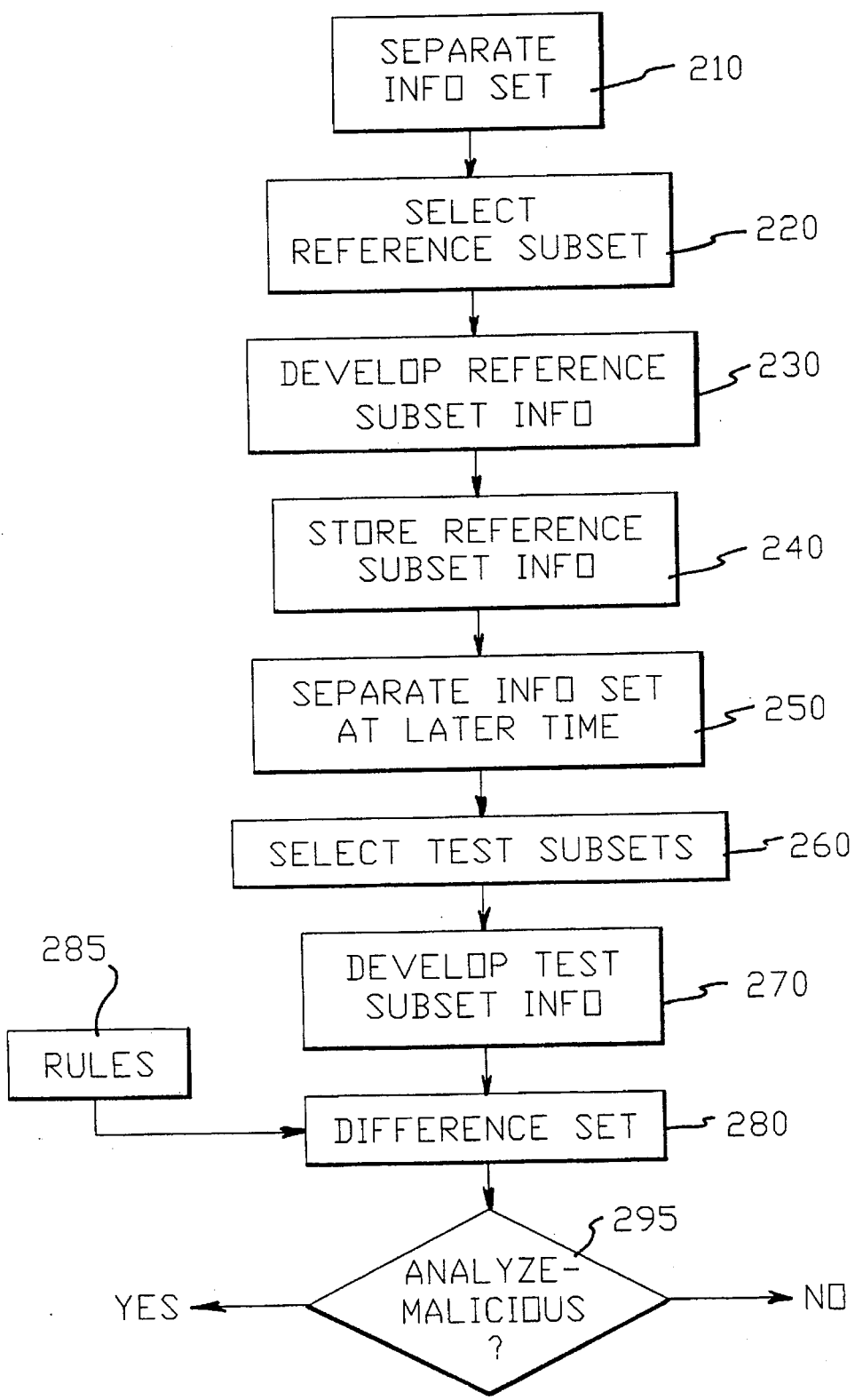

DISCRIMINATION OF MALICIOUS CHANGES TO DIGITAL INFORMATION USING MULTIPLE SIGNATURES

FIELD OF THE INVENTION

This invention relates to the field of detecting and discriminating changes to digital information using digital signatures or encryption. More specifically, the invention relates to using multiple digital signatures to determine whether changes to the digital information were innocent or malicious.

BACKGROUND OF THE INVENTION

In many fields of information processing, data at one place in a system (for instance, data sent from the far end of a communication link) should be identical to data at another place in the system (for instance, data received at the near end of a communication link). Various means have been devised to determine that two pieces of data are in fact identical. One common way is to generate a digital signature for each data object, and then to compare the signatures. (A digital signature is a comparatively short string of bits produced by applying a fixed algorithm to a longer piece of digital data; many different digital signature algorithms are known to practitioners.) Since digital signatures are much smaller than the objects they represent, they can be transmitted and compared quickly and reliably.

It is important, of course, to design digital signature algorithms so that the most likely changes to data objects are reflected in changes to their signatures; there is much art in this field. For instance, U.S. Pat. Nos. 4,881,264 (to Merkle) and 5,097,504 (to Camion et al.) both describe ways to verify that a particular data object has not been altered by using one or more digital signatures in the verification.

Various forms of malicious software (including "computer viruses" and other "Trojan Horses") operate by surreptitiously altering software objects in an attacked system. The problem of discovering such changes is somewhat different from simply determining whether two data objects are in fact identical, because in a system various legitimate activities also make changes to objects over time. Therefore, there is a need for methods that can differentiate legitimate changes in a system from malicious ones.

The traditional approach to detecting such undesirable changes involves computing and storing a digital signature or signatures for each object to be protected, and periodically recomputing the signature(s) and comparing to the previous value. Objects for which the signature information has changed are judged to have been altered, and the user is alerted to the fact. The primary weakness of these methods is that they typically tell the user only which files have changed, and the user must judge whether or not the change was legitimate. The differentiation of legitimate from malicious changes cannot be done simply by detecting that some change has in fact occurred.

In general, a "malicious" change is one that is done without the knowledge or consent of the data owner, typical by a computer virus or similar unauthorized program. A "legitimate" change is one that results from some intentional action of the data owner, such as upgrading to a new level of software, or making configuration changes to some application program which stores configuration data internally.

OBJECTS OF THE INVENTION

An object of the invention is an improved system and method for detecting whether or not digital information has been changed in a way that is likely to be malicious.

SUMMARY OF THE INVENTION

The present invention is a system and method for using stored information about the software objects to be protected in a computer system to aid in deciding whether a change to one or more of those objects was caused by normal system operation or by a malicious program. The invention uses a separation algorithm to separate, at a reference time, one or more digital objects into reference subsets of information that describe the object contents. One or more of these reference subsets is then selected by a selection algorithm. An information algorithm associated with each selected reference subset then develops reference subset information about the respective subset which is stored. At some later time, called the test time, a test separation algorithm is used to separate the digital signatures of the object into test subsets of information that describe the object contents at test time. One or more of these test subsets is then selected by the a selection algorithm. An information algorithm that is associated with each selected test subset then develops test subset information about the respective test subset. The test subset information and the reference subset information is then compared to develop a set of differences. Rules are applied to the set of differences to determine whether the digital information at test time was changed from the digital information at reference time. Rules can establish criteria to determine if the change was malicious.

BRIEF DESCRIPTION OF THE DRAWINGS

FIG. 2 is a flow chart showing the steps of the present invention.

DETAILED DESCRIPTION OF THE INVENTION

Figure 1:
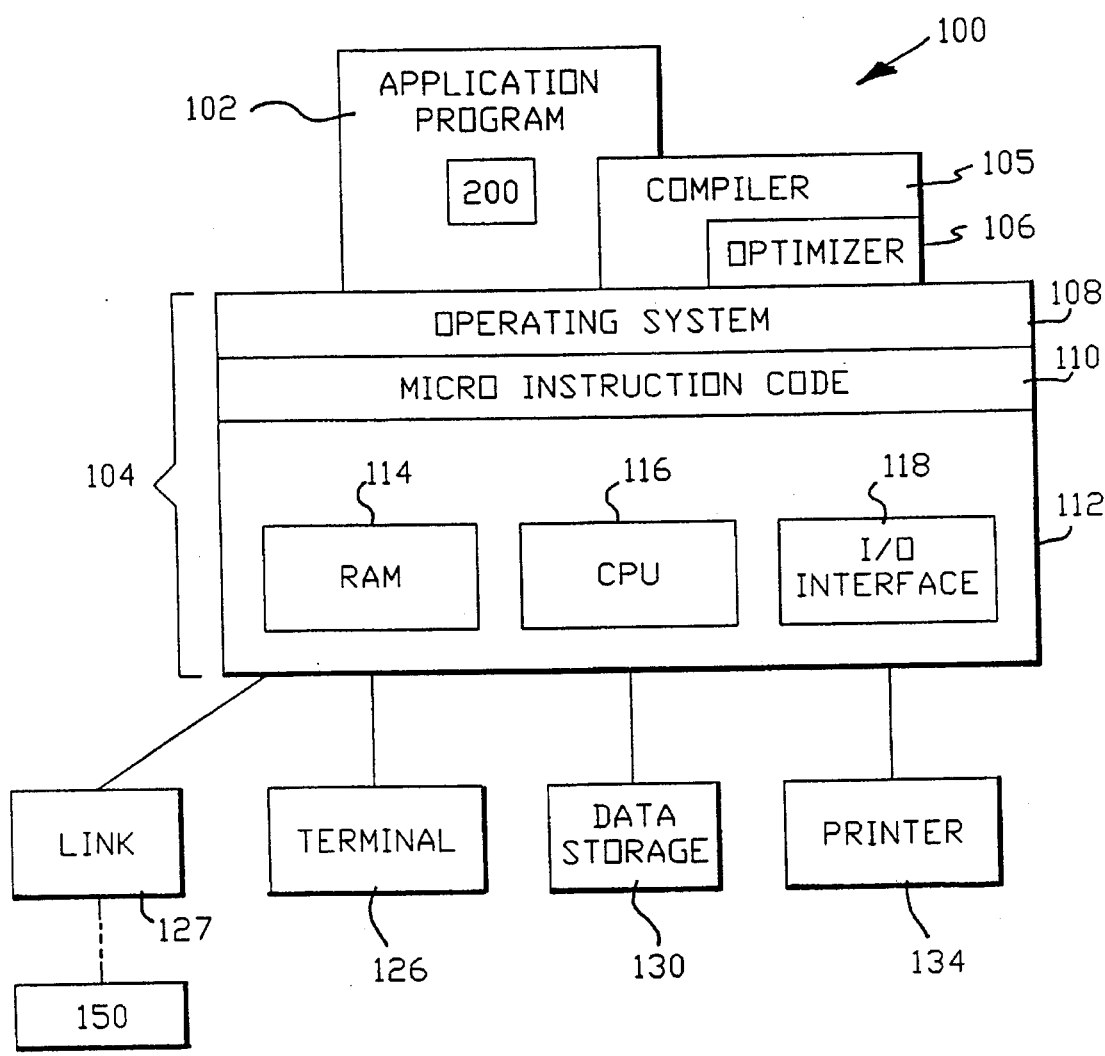
FIG. 1 is a block diagram of the hardware of a computer system running the present invention.

FIG. 1 is a block diagram showing a computer system 100 on which a preferred embodiment of the present invention operates. The preferred embodiment includes one or more application programs one of which is the method 200 shown in FIG. 2. Another type of application program 102 is a compiler 105 which includes an optimizer 106. The compiler 105 and optimizer 106 are configured to transform a source (like an application program 102) program into optimized executable code. More generally, the source program is transformed to an optimized form and then into executable code. The compiler 105 and optimizer 106 operate on a computer platform 104 that includes a hardware unit 112. The hardware unit 112 includes one or more central processing units (CPU) 116, a random access memory (RAM) 114, and an input/output interface 118. Microinstruction code 110, for instance a reduced instruction set, may also be included on the platform 104. Various peripheral components may be connected to the computer platform 104 including a terminal 126, a data storage device 130, and a printing device 134. A link 127 may also be included to connect the system 100 to one or more other similar systems 150. The link 127 is used to transmit digital information between the computers (100 and 150). An operating system 108 coordinates the operation of the various components of the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100.

FIG. 2 is a flowchart showing the method steps 200 involved in a preferred embodiment of the present invention.

The invention operates on data objects in a computing system. A data object is any set of digital data which is stored in the system; examples of data objects include data files, program files, other sorts or files, and non-file objects such as boot records. Non-file objects are data objects which, while not treated by the operating system as individual files, are still stored in the system and used by the system at some level.

Every data object has some (possibly empty) contents, consisting of the data that makes up the object itself. Typical data objects also have other related information, such as the time and date the object was created, the time and date it was last modified, the length of the object's content, the owner of the object, the logical structure of the information within the object, and so on; this other information is referred to as system-maintained information about the object.

The reference separation step 210 of method 200 divides the data object being processed, including the object's contents and other system-maintained information about the object, into one or more reference subsets for subsequent processing. Note that the reference subsets can be disjoint, i.e., they would not include common elements. They can also be overlapping.

For instance, in a typical general-purpose computing system, this step might divide a set of file information into one block containing the system-maintained time, date, and length information, and a number of other blocks, each containing 512 bytes of information from the object's contents.

In a system such as the IBM PC-DOS, when dealing with program objects which have an internal structure (such as EXE-format files), this step 210 might divide such objects into reference subsets according to the internal structure of the object. An EXE-format file might be divided into a single block of header information, and then 512-byte blocks of image contents, for instance.

In other operating systems where files of digital information are partitioned into subsets called "forks", the separation step might divide the file's content information into the individual forks, and then subdivide each fork into 512-byte blocks. System-maintained information reflecting the time, date, length, and internal structure (fork names and sizes, for instance) of the file could be passed along in a separate block.

Information which may be divided up and passed along by the separation step thus includes all system-maintained information about tile file and its structure, as well as the actual digital contents of the object itself.

(Various techniques of dividing up data objects for other purposes are known to the art; for instance, when a file is to be sent from one system to another by a protocol that uses fixed-length transmission packets, the file is divided up into equal-sized blocks during the transmission process, and at least some system-maintained information is often passed along as a separate block. However, this is done for ease of communication and media-sharing, not for discrimination of malicious changes.)

After the reference separation step has divided up the data object into reference subsets, the reference selection step 220 selects one or more of the reference subsets generated 210. For instance, of the example reference subsets mentioned in the previous paragraph a preferred selection algorithm might select the entire contents of the time/date/length block, and then the first and last of the 512-byte data blocks. Many other selection algorithms are possible; there is a trade-off between storage space used and accuracy of the ultimate discrimination. The more reference subsets that are selected for further processing, the more information the algorithm 200 has with which to work and therefore the more accurate the algorithm is likely to be. On the other hand, this also increases the storage space required to store the reference information.

The reference information step 230 transforms the selected reference subsets for storage. For instance, of the example subsets selected in the previous paragraph, it might copy the time/date/length block verbatim (since it is small), and use a digital signature algorithm to produce 8-byte signatures of the 512-byte data blocks. Any digital signature algorithm known in the art, or any novel algorithms with appropriate properties, may be employed here. The important feature is that the signature produced should be as sensitive as is practical to changes in the content of the information subsets.

Once the reference subset information has been developed 230, it is then stored 240 on any appropriate storage medium in the computing system. For instance, the information developed in the previous paragraph might be stored in a normal file on the main data storage device 130.

At a later time, the "test" time, when it is desired to determine whether or not a malicious change has been made to the data object, the information pertaining to the object is separated into test subsets 250. The test separation algorithm 250 may be identical to the reference separation algorithm 210, or it may use some or all of the stored reference subset information 240 as well as other stored system information in determining how to separate the information. That is, the test separation algorithm 250 may employ information about the state of the object at reference time when deciding how to separate it at test time. Note that the test subsets can be disjoint or overlapping.

Another implementation would not use any stored reference information in the test separation algorithm 250; for instance, the test separation algorithm 250 could always separate out the first and last 512 bytes of the file at test time, regardless of the length of the file at reference time.

Once the information has been separated into test subsets 250, the test selection step 260 selects one or more of the test subsets for further processing. Again, this algorithm may be identical to the one used in the reference selection step 220, or it may make use of stored reference information in determining which test subsets to select. For instance, when processing a normal file, the test subset algorithm might select the entire time/date/length block, the first 512-byte data block, and the 512-byte data block corresponding to the last 512 bytes of the \*reference\* file (that is, if the file has grown between reference time and test time, the block selected would reflect the location of the end of the original shorter file, not the new longer one).

Once the test subsets have been selected 260, the test information step 270 transforms the selected test subsets for comparison. Again, this step may be identical to the corresponding step at reference time 230, or it may make use of stored reference information.

Once test subset information has been developed 270, it is compared with the stored reference subset information, and a description of the differences is formed 280. For instance, the difference description might indicate whether or not the system-maintained time and date of tile file has been changed, the difference (if any) between the system-maintained lengths recorded at reference and test times, and whether or not the signatures of each of the two 512-byte data blocks selected has changed.

Once the difference description, i.e., set of differences, has been formed 280, rules 285 are applied to it to determine 295 whether or not the changes detected are likely to be malicious.

Rules 285 establish criteria for determining whether or not an analysis 295 of the set of differences 280 indicates change, more specifically a malicious change. One possible rule 285 corresponding to the above examples would be that if a file has grown by at least 100 bytes, and the signature of the first 512-byte block has changed, and the signature of the other 512-byte block has not changed, then analysis 295 would indicate that the change is probably malicious 295. This is because many viruses alter the beginning of a program, leave the rest unchanged, and then add a copy of the virus itself to the end.

Another example of a rule or set of rules 285 is as follows: If information is kept about more of the contents of tile file (for instance, ten additional 512-byte blocks in addition to those mentioned in the previous examples), and the signatures of all those content-areas has changed, tile change is more likely to be legitimate 295. This is because a typical installation of a new version of a program will involve at least small changes to all areas of the program.

Another rule or set of rules 285 might be: If the differences between the reference and test information indicate that the file has remained the same size, and the entrypoint information has not changed, and only one area of the file's content has changed, the change is likely to be caused by a simple patch to the program, rather than by a virus 295.

It is evident that one skilled in the art given this disclosure could develop equivalent methods that are within the scope of this invention. For example, different separation, selection, and information algorithms and various combinations of these algorithms could be used. Further, many rules can be developed that establish criteria that indicates a malicious change (or not) to an object.

I claim:

1. A computer implemented method for determining whether changes to a set of digital information are innocent or malicious, comprising the steps of:

using a reference separation algorithm, separating the set of digital information into a plurality of reference subsets of digital information, the step of separating the set of digital information into reference subsets being done at a reference time;

using a reference selection algorithm, selecting a plurality of the reference subsets;

using a reference information algorithm associated with each respective selected reference subset, deriving characteristic reference subset information from the respective selected reference subset;

storing the derived characteristic reference subset information;

using a test separation algorithm, separating the set of digital information into a plurality of test subsets of digital information, the step of separating the set of digital information into test subsets being done at a test time, the test time being later than the reference time;

using a test selection algorithm, selecting a plurality of the test subsets, each selected test subset corresponding to a selected reference subset;

using a test information algorithm associated with each respective selected test subset, deriving characteristic test subset information from the respective selected test subset;

comparing the derived characteristic test subset information to the derived characteristic reference subset information to produce a set of differences; and analyzing the set of differences in accordance with a set of rules to determine whether the set of digital information at test time is changed from the set of digital information at reference time and if changed to determine whether the change is considered malicious or innocent, each of said rules specifying a particular combination of the selected test subsets, and specifying a state for the characteristic information of each selected test subset of each said particular combination relative to the characteristic information of each corresponding selected reference subset, and specifying for each said particular combination having its selected test subsets in said specified stake either a malicious conclusion or an innocent conclusion.

2. A method, as in claim 1, where the information generated by the reference information algorithm and the test information algorithm includes information about the structure of the reference and test subsets.

3. A method, as in claim 1, where the information generated by the reference information algorithm and the test information algorithm includes other system-maintained information about the reference and test subsets.

4. A method, as in claim 2, where the reference information algorithm and the test information algorithm are the same for each respective reference and test subset.

5. A method, as in claim 1, where the information generated by the reference information algorithm and the test information algorithm comprises signature information about the reference and test subsets.

6. A method, as in claim 5, where the reference information algorithm and the test information algorithm are the same for each respective reference and test subset.

7. A method, as in claim 1, where the reference and test subsets include the entire set of digital information.

8. A method, as in claim 1, where the rules establish that the change is malicious if the set of differences indicates that the entry point to the set of digital information has been moved, but that most of the information has remained the same.

9. A method, as claim 1, where the rules establish that a simple patch has occurred and the change is not malicious if the set of differences indicates that the size of the set of information has remained the same and the entrypoint information has not changed but that one area of the set of information has changed.

10. A method, as in claim 1, where the digital information is a structured object and the separation algorithms separate the object into reference and test subsets comprising fixed-sized blocks.

11. A method, as in claim 1, where the digital information is a file with multiple resource forks and the separation algorithms separate the forks into separate subsets.

12. A method, as in claim 1, where the test separation algorithm uses information from the stored reference subset information to determine how to separate the digital data at test time.

13. A computer implemented system for determining whether changes to a set of digital information are innocent or malicious, comprising:

a computer having a data storage element and a platform for executing one or more application programs; and an application program comprising means for implementing the steps of:

using a reference separation algorithm, separating the set of digital information into a plurality of reference subsets of digital information, the step of separating the set of digital information into reference subsets being done at a reference time;

using a reference selection algorithm, selecting a plurality of the reference subsets;

using a reference information algorithm associated with each respective selected reference subset, deriving characteristic reference subset information from the respective selected reference subset;

storing the derived characteristic reference subset information;

using a test separation algorithm, separating the set of digital information into a plurality Of test subsets of digital information, the step of separating the set of digital information into test subsets being done at a test time, the test time being later than the reference time;

using a test selection algorithm, selecting a plurality of the test subsets, each selected test subset corresponding to a selected reference subset;

using a test information algorithm associated with each respective selected test subset, deriving characteristic test subset information from the respective selected test subset;

comparing the derived characteristic test subset information to the derived characteristic reference subset information to produce a set of differences; and analyzing the set of differences in accordance with a set of rules to determine whether the set of digital information at test time is changed from the set of digital information at reference time and if changed to determine whether the change is considered malicious or innocent, each of said rules specifying a particular combination of the selected test subsets, and specifying a state for the characteristic information of each selected test subset of each said particular combination relative to the characteristic information of each corresponding selected reference subset, and specifying for each said particular combination having its selected test subsets in said specified state either a malicious conclusion or an innocent conclusion.

14. A system, as in claim 13, further comprising:

a link connecting the system to one or more other computers, whereby the application program determines whether or not digital information sent to the computer system over the link has been changed maliciously.

\* \* \* \* \*